US008476838B2

(12) United States Patent
Matsui et al.

(10) Patent No.: US 8,476,838 B2
(45) Date of Patent: Jul. 2, 2013

(54) LIGHT SOURCE LIGHTING CIRCUIT AND LAMP SYSTEM FOR VEHICLE

(75) Inventors: Kotaro Matsui, Shizuoka (JP); Takao Sugiyama, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 151 days.

(21) Appl. No.: 13/198,987

(22) Filed: Aug. 5, 2011

(65) Prior Publication Data

US 2012/0032591 A1 Feb. 9, 2012

(30) Foreign Application Priority Data

Aug. 5, 2010 (JP) ................... 2010-176196

(51) Int. Cl.
  *H05B 37/02* (2006.01)
  *H05B 37/00* (2006.01)
(52) U.S. Cl.
  USPC .................. 315/209 R; 315/200 R
(58) Field of Classification Search
  USPC .......... 315/200 R, 202, 203, 207, 208, 209 R, 315/209 SC, 307, 291, 302
  See application file for complete search history.

(56) References Cited

U.S. PATENT DOCUMENTS

| 5,872,430 | A | * | 2/1999 | Konopka | 315/219 |
| 5,982,111 | A | * | 11/1999 | Moisin | 315/283 |
| 7,545,102 | B2 | * | 6/2009 | Lee et al. | 315/200 R |
| 7,656,103 | B2 | * | 2/2010 | Shteynberg et al. | 315/312 |

FOREIGN PATENT DOCUMENTS

JP 2005-29020 2/2005

* cited by examiner

*Primary Examiner* — Minh D A
(74) *Attorney, Agent, or Firm* — Fish & Richardson P.C.

(57) ABSTRACT

A lighting circuit includes: a countercurrent prevention unit including a first control terminal and a second control terminal, the countercurrent prevention unit transmitting a first current or a second current; and a current controller including: a common terminal connected to the first control terminal and the second control terminal; and a switching terminal connected to the first control terminal, the current controller providing a first driving current or a second driving current from the common terminal to the light source. The countercurrent prevention unit further includes: a first rectifier, wherein voltage at the first control terminal is provided to the switching terminal through the first rectifier; a first P-FET provided between the first control terminal and the common terminal; a second P-FET provided between the second control terminal and the common terminal; and a second rectifier provided between the second P-PET and the common terminal.

7 Claims, 3 Drawing Sheets

LIGHT SOURCE LIGHTING CIRCUIT AND LAMP SYSTEM FOR VEHICLE

CROSS-REFERENCE TO RELATED APPLICATION

This application claims priority from Japanese Patent Application No. 2010-176196, filed on Aug. 5, 2010, the entire contents of which are hereby incorporated by reference.

BACKGROUND

1. Technical Field

The present disclosure relates to a lighting circuit for a light source that lights the light source, and a lamp system for a vehicle.

2. Description of the Related Art

In the related art, a lighting circuit for a light source ("a light source lighting circuit") has been known including a first circuit (e.g., a circuit for a stop lamp) that supplies a first driving current (e.g., a constant current) to a light source and a second circuit (e.g., a circuit for a tail lamp) that supplies a second driving current (e.g., a constant current) smaller than the first driving current to the light source (see, e.g., JP 2005-029020 A).

In order to prevent a countercurrent caused by a reverse connection of a battery, a first diode is connected between the first circuit and the light source, and a second diode is also connected between the second circuit and the light source.

When DC power voltage is input only to the first circuit, the first driving current is supplied to the light source from the first circuit by driving only the first circuit. When the DC power voltage is provided to the first circuit and the second circuit, the second driving current is supplied to the light source from the second circuit by driving only the second circuit.

However, in related art as described above, when only the first circuit is driven, the first driving current is larger than the second driving current, so that the first diode needs to have a large maximum rated voltage and thus, an expensive diode is required to be used as the first diode. As a result, the cost of the light source lighting circuit and the lamp system for a vehicle including the same is increased.

SUMMARY OF THE INVENTION

The present disclosure has been made to reduce product costs and circuit loss while maintaining a function to prevent a countercurrent.

According to one or more illustrative aspects of the present invention, there is provided a lighting circuit for a light source. The lighting circuit comprises: a countercurrent prevention unit comprising a first control terminal and a second control terminal, the countercurrent prevention unit configured to transmit a first current or a second current that is smaller than the first current to the light source; and a current controller comprising: a common terminal connected to the first control terminal and the second control terminal; and a switching terminal connected to the first control terminal, the current controller configured to provide a first driving current or a second driving current from the common terminal to the light source, wherein the first driving current corresponds to the first current, and the second driving current corresponds to the second current. The countercurrent prevention unit further comprises: a first rectifier, wherein voltage at the first control terminal is provided to the switching terminal through the first rectifier; a first P-FET provided between the first control terminal and the common terminal; a second P-FET provided between the second control terminal and the common terminal; and a second rectifier provided between the second P-PET and the common terminal, wherein the second rectifier is series-connected to the second P-PET. When DC power voltage is provided to the first control terminal, the first P-FET is turned-on and the second P-FET is turned-off, and then the countercurrent prevention unit transmits the first current to the light source. When the DC power voltage is not provided to the first control terminal but provided to the second control terminal, the second P-FET is turned-on, and then the countercurrent prevention unit transmits the second current to the light source.

According to the configuration described above, even when the first driving current is first output by inputting the DC power voltage to a first control terminal, the exemplary embodiment of the present disclosure uses a P channel FET ("P-FET") with a low on-resistance having the countercurrent prevention function, such that the product costs of the light source lighting circuit and the lamp system for a vehicle including the same may be reduced, the power consumption of the circuit may be reduced, and it is ensured that the countercurrent caused by the reverse connection of the battery may be prevented, as compared with the case of using a diode.

DETAILED DESCRIPTION

Hereinafter, exemplary embodiments of a light source lighting circuit according to the present disclosure will be now described with reference to the drawings. The light source lighting circuit is, for example, a circuit for lighting a plurality of light sources mounted in a lamp system for a vehicle. Hereinafter, a case of using a light source as, for example, a daytime running lamp and a position lamp will be now described. In addition, when a command to light the daytime running lamp is issued from a countercurrent prevention unit, the light source serves as the daytime running lamp, and when a command to light the position lamp is issued from the countercurrent prevention unit, the light source serves as the position lamp. In addition, when a command to light both of the daytime running lamp and the position lamp is issued, the light source serves as the daytime running lamp.

Figure 1:
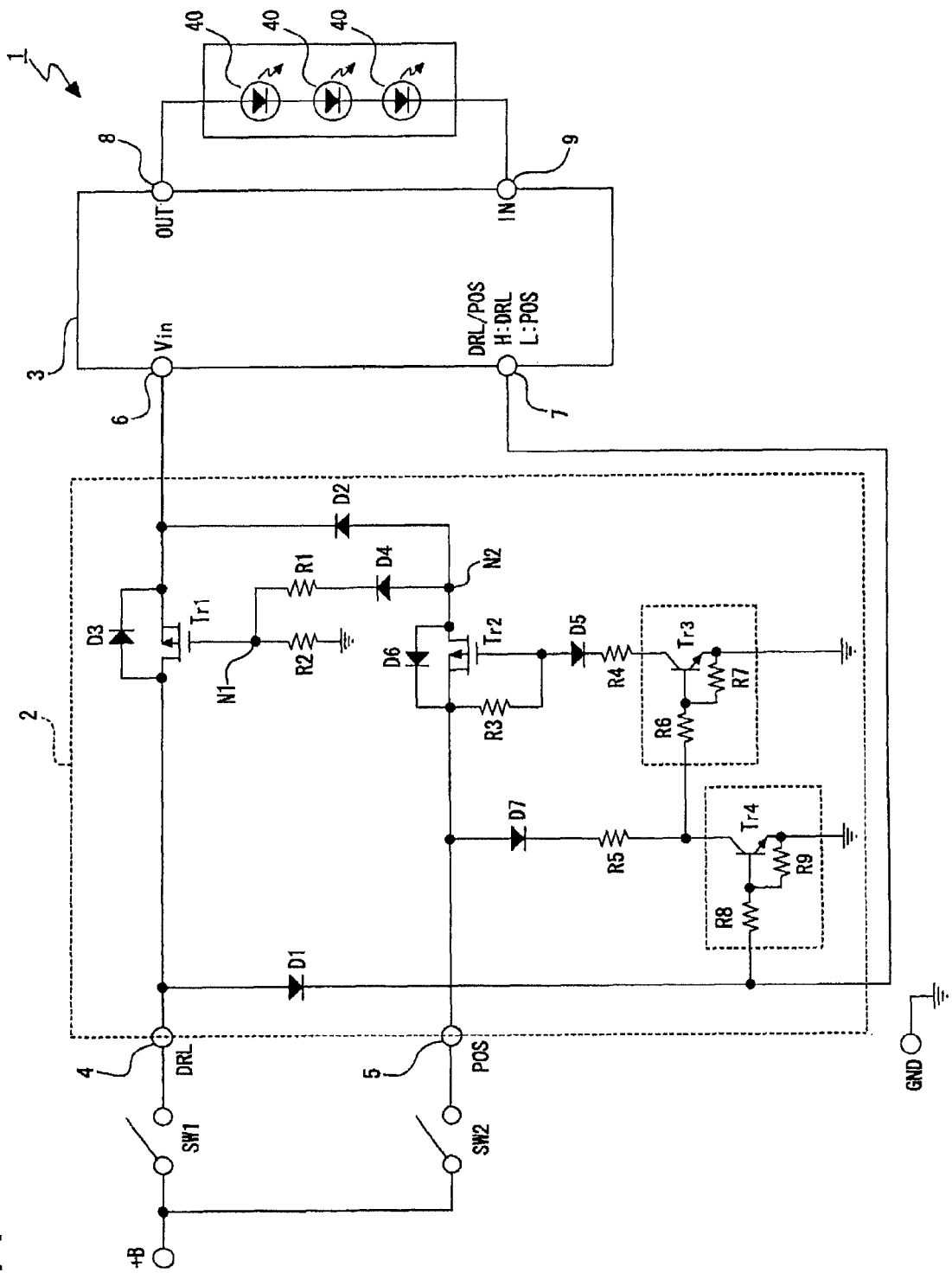
FIG. 1 is a diagram illustrating the configuration of a light source lighting circuit according to an exemplary embodiment of the present disclosure.

As shown in FIG. 1, a light source lighting circuit 1 includes a countercurrent prevention unit 2 having a first control terminal 4 and a second control terminal 5, and a current controller 3 having a common terminal 6 and a switching terminal 7.

The countercurrent prevention unit 2 includes a first P-FET ("PMOS Tr1"), a second P-FET ("PMOS Tr2"), and NPN transistors Tr3 and Tr4 ("NPN Tr3", "NPN Tr4") (a switch driving circuit). The countercurrent prevention unit 2 provides voltage from the first control terminal 4 to the switching terminal 7 through a diode D1 (a first rectifier). The countercurrent prevention unit 2 provides voltage from the second control terminal 5 to the common terminal 6 through a diode D2 (a second rectifier).

The PMOS Tr1 has a drain connected to the first control terminal 4, a source connected to the common terminal 6, and a gate connected to a drain of the PMOS Tr2 through a resistor R1 and a diode D4 (a third rectifier). A parasitic diode D3 is present between the source and the drain.

The Resistor R1 has one end connected to the gate of the PMOS Tr1 through a first connection point N1 and the other end connected to a second connection point N2 of the PMOS Tr2 and the diode D2 (a second rectifier).

A resistor R2 (a second resistor) has one end connected to the gate of the PMOS Tr1 and one end of the resistor R1 through the first connection point N1 and the other end connected to the ground. The resistance value of the resistor R2 is larger than that of the resistor R1. Further, a potential difference generating element (a zener diode or resistor) may be connected between the first connection point N1 and the source of the PMOS Tr1.

The PMOS Tr2 has a drain connected to the common terminal 6 through the diode D2, a source connected to the second control terminal 5, and a gate connected to the collector of the NPN Tr3 through a diode D5 and a resistor R4. A parasitic diode D6 is present between the source and the drain. The PMOS Tr2 and diode D2 are connected to each other in series.

The NPN Tr3 has an emitter connected to the ground and a base connected to a collector of the NPN Tr4 through a resistor R6. A resistor R7 is connected between the base and the emitter.

The NPN Tr4 has an emitter connected to a ground, a base connected to first control terminal 4 through a resistor R8 and diode D1, and a collector connected to the second control terminal 5 and the source of the PMOS Tr2 through a resistor R5 and a diode D7. A resistor R9 is connected between the base and the emitter.

The current controller 3 includes the common terminal 6, the switching terminal 7, an output terminal 8, and an input terminal 9, and supplies a driving current through the output terminal 8 to light emitting diodes (LEDs) 40, 40, and 40 connected in series as a light source.

In the following description, the driving current that lights the daytime running lamp is referred to as a first driving current I1 (a corresponding current to the first current), and the driving current that lights the position lamp is referred to as a second driving current I2 (a corresponding current to the second current).

Figure 2:
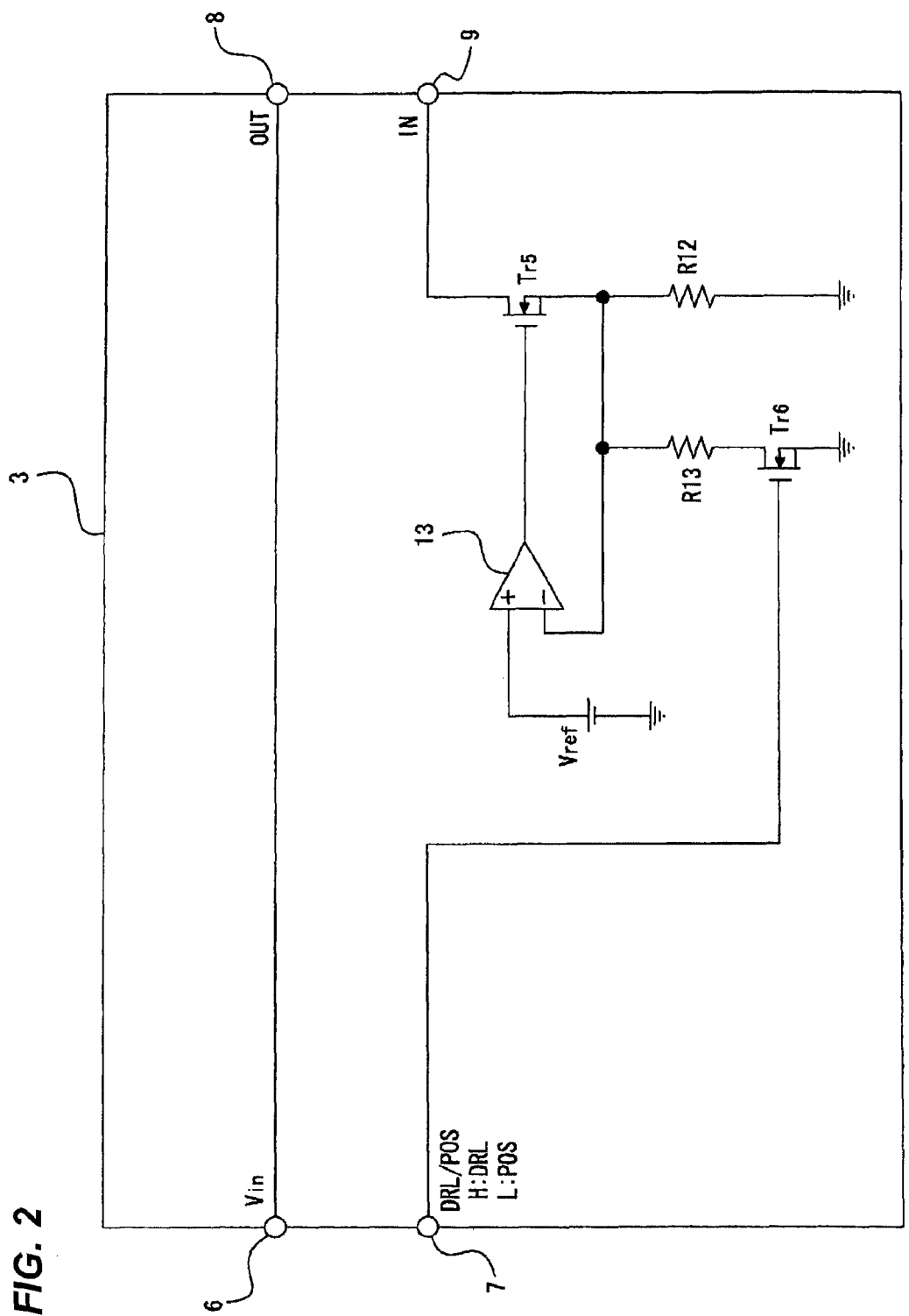
FIG. 2 is a diagram illustrating an example of a current control circuit.

As a first example of the current controller 3, a constant current clamp circuit including an operational amplifier and an NMOS transistor at the cathode sides of the LEDs 40, 40, and 40 may be used (see, e.g., FIG. 2). The constant current clamp circuit has a function that feeds back the driving voltage corresponding to the driving current of the LEDs 40, 40, and 40 to stably control the driving current, so that the driving voltage becomes a preset reference voltage.

The constant current clamp circuit is configured to include an operational amplifier 13, NMOS Tr5 and NMOS Tr6, and resistor R12 and resistor R13.

The switching terminal 7 is connected to a gate of the NMOS Tr6. The NMOS Tr6 has a drain connected to an inverting input terminal of operational amplifier 13 through a resistor R13 and a source connected to the ground. A predetermined reference voltage Vref is provided to a non-inverting input terminal of the operational amplifier 13. The output from the operational amplifier 13 is provided to a gate of the NMOS Tr5. The NMOS Tr5 has a drain connected to the input terminal 9 and a source connected to one end of each of the resistors R12 and R13.

Figure 3:
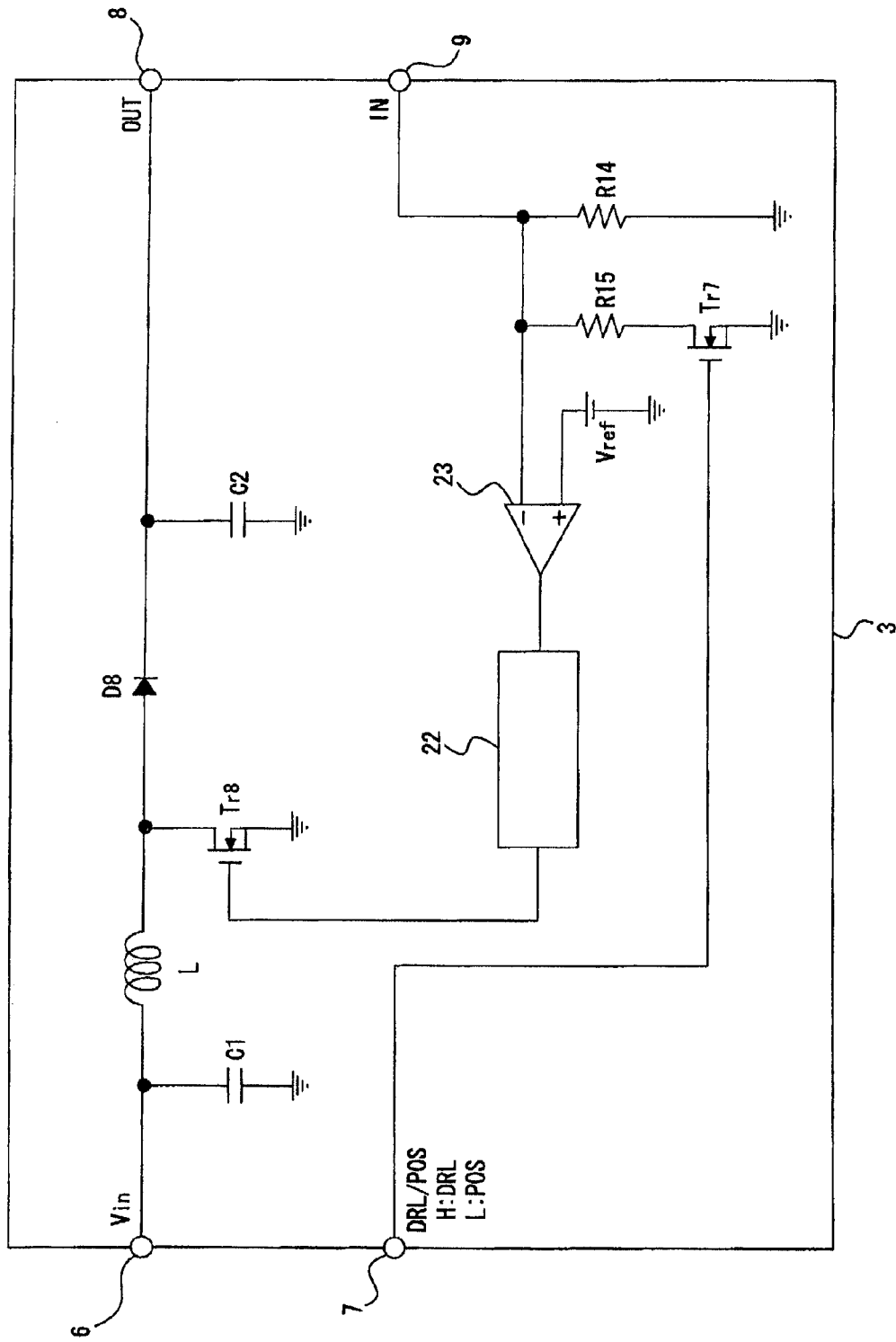
FIG. 3 is a diagram illustrating another example of a current control circuit.

In addition, as a second example of the current controller 3, a switching regulator circuit including a PWM comparator, an error amplifier, and an NMOS transistor may be used (see, e.g., FIG. 3). The switching regulator circuit feeds back the first driving voltage or the second driving voltage corresponding to the first driving current I1 or the second driving current I2 that is supplied to LEDs 40, 40, and 40, respectively, to switch the switching element at a high speed so that the first driving voltage or the second driving voltage becomes a preset reference voltage, and to change the duty ratio of on/off of the switching element. In other words, the switching regulator circuit serves to stably control the first driving current I1 or the second driving current I2 supplied to the LEDs 40, 40, and 40.

The switching regulator circuit includes capacitors C1 and C2, a choke coil L, NMOS Tr7 and Tr8, a PWM comparator 22, an error amplifier 23, and resistors R14 and R15.

The common terminal 6 is connected to the capacitor C1 and the choke coil L. The first driving current I1 or the second driving current I2 from the common terminal 6 is supplied to the output terminal 8 through the choke coil L and the diode D8.

The switching terminal 7 is connected to a gate of the NMOS Tr7. The NMOS Tr7 includes a drain connected an inverting input terminal and the input terminal 9 of the error amplifier 23 through the resistor R15, and a source connected to the ground. The input terminal 9 is connected to one end of each of the resistor R14 and the resistor R15. A predetermined reference voltage Vref is provided to the non-inverting input terminal of the error amplifier 23. The output from the error amplifier 23 is provided to the PWM comparator 22. The output from the PWM comparator 22 is provided to the gate of the NMOS transistor Tr8. The NMOS Tr8 includes a drain connected to the choke coil L and the diode D8, and a source connected to the ground.

A switch SW1 and a switch SW2 each having an on/off function are connected between the countercurrent prevention unit 2 and the battery (a DC power supply (+B)) (see, e.g., FIG. 1). When only the switch SW1 is turned-on, the DC power voltage is transmitted to the first control terminal 4 to supply the first driving current I1 to the LEDs 40, 40, and 40. When only the switch SW2 is turned-on, the DC power voltage is transmitted to the second control terminal 5 to cause the first driving current I2 to be supplied to the LEDs 40, 40, and 40. When the switch SW1 and the switch SW2 are simultaneously turned-on, the DC power voltage is transmitted to the first control terminal 4 and the second control terminal 5 to cause the first driving current I1 to be supplied to the LEDs 40, 40, and 40.

In addition, a plurality of earth terminals is disposed in the light source lighting circuit 1, and all of the earth terminals are electrically connected.

Hereinafter, the operation of the light source lighting circuit 1 will be described with reference to three different cases of (A) when only the switch SW1 is turned-on, (B) when only the switch SW2 is turned-on, and (C) when the switches SW1 and SW2 are simultaneously turned-on.

(A) First of all, the operation of the lighting control circuit 1 when only the switch SW1 is turned-on will be described.

When only the switch SW1 is turned-on, the DC power voltage (+B) is provided to the first control terminal 4 but not to the second control terminal 5, and the DC power voltage (e.g., a control signal) is transmitted to the parasitic diode D3 and the base of the NPN Tr4 through the first control terminal 4. Current flows in the parasitic diode D3 to generate the potential difference between the gate and the source of the PMOS Tr1, thereby turning-on the PMOS transistor Tr1. In this case, the output from the switching terminal 7 is in a high level, such that a first current is supplied to the common terminal 6.

The NPN Tr4 is turned-on by receiving the DC power voltage (e.g., a control signal) through the diode D1. When the NPN Tr4 is turned-on, the NPN Tr3 is turned-off. Therefore, since the potential difference is not generated in resistor R3 and the gate-source voltage of the PMOS Tr2 is not generated, the PMOS transistor Tr2 is turned-off. Therefore, voltage is not applied to the gate of the PMOS Tr1 and thus the PMOS Tr1 is maintained in a turn-on state. Therefore, the first driving current I1 is transmitted to the common terminal 6 through the PMOS Tr1.

In addition, the DC power voltage is provided to the switching terminal 7 through the diode D1.

Hereinafter, the operation of the current controller 3 after the DC power voltage is provided to the switching terminal 7 will be described with reference to a case in which the current controller 3 uses the constant current clamp circuit (see, e.g., FIG. 2) and a case in which the current controller 3 uses the switching regulator circuit (see, e.g., FIG. 3).

When the current controller 3 uses the constant current clamp circuit, the DC power voltage provided to the switching terminal 7 is provided to the gate of the NMOS Tr6 to cause the NMOS Tr6 to be turned-on.

When the NMOS Tr6 is turned-on, the current value of the first driving current I1 flowing between the drain and the source of the NMOS Tr5 is controlled so that the voltage drop amount generated by the resistance resulted from the parallel connection of the resistor R13 and the resistor R12, and reference voltage Vref become equal to each other. As a result, the first driving current I1 is controlled to be constant.

When the current controller 3 uses the switching regulator circuit, the DC power voltage provided to the switching terminal 7 is provided to the gate of the NMOS Tr7 to cause the NMOS Tr7 to be turned-on.

When the NMOS Tr7 is turned-on, the first driving voltage that is the voltage drop amount generated by the resistance resulted from the parallel connection of the resistor R14 and the resistor R15 in regard to the current value of the first driving current I1 transmitted from the input terminal 9, is provided to the inverting input terminal of the error amplifier 23. The output from the error amplifier 23 is transmitted to the PWM comparator 22 so that the first driving voltage becomes the preset reference voltage Vref. The PWM comparator 22 turns-on/off the NMOS Tr8 at a high speed based on the on/off duty ratio determined by a preset sawtooth wave and the output from the error amplifier 23. As a result, the NMOS Tr8 is controlled to cause the first driving current I1 to be constant, so that the first driving voltage is fed back to become a preset reference voltage Vref.

(B) Next, the operation of the lighting control circuit 1 when only the switch SW2 is turned-on will be described.

When the switch SW1 is turned-off and the switch SW2 is turned-on, the DC power voltage (+B) is not provided to the first control terminal 4 but provided to the second control terminal 5. As a result, the NPN Tr4 is turned-off and the DC power voltage (e.g., a control signal) is transmitted to the base of the NPN Tr3 through the second control terminal 5, the resistor R5, and the resistor R6 to cause the NPN Tr3 to be turned-on.

When the NPN Tr3 is turned-on, a potential difference is generated in the resistor R3 to generate the gate-source voltage of the PMOS Tr2, thereby turning-on the PMOS Tr2.

When the PMOS Tr2 is turned-on, the output from the switching terminal 7 of the current controller 3 becomes a low level, such that the second current is supplied to the common terminal 6 through the diode D2.

Since voltage is applied to the gate of the PMOS Tr1 through the diode D4, the PMOS Tr1 is turned-off. In addition, even when the second control terminal 5 is reversely connected or the voltage from the second control terminal is 0V, the countercurrent flowing in the countercurrent prevention unit 2 may be blocked due to the presence of the diode D4.

In addition, the DC power voltage is not input to the switching terminal 7.

When the current controller 3 uses the constant current clamp circuit (see, e.g., FIG. 2), since the DC power voltage is not input to the switching terminal 7, the NMOS Tr6 is turned-off.

When the NMOS Tr6 is turned-off, the current value of the second driving current I2 flowing between the drain and the source of the NMOS Tr5 is controlled so that the voltage drop amount generated by the resistor R12 and the reference voltage Vref becomes equal to each other. As a result, the second driving current I2 is controlled to be constant.

When the current controller 3 uses the switching regulator circuit (see, e.g., FIG. 3), since the DC power voltage is not provided to the switching terminal 7, the NMOS Tr7 is turned-off.

When the NMOS Tr7 is turned-off, the second driving voltage that is the voltage drop amount generated by the resistor R14 in regard to the current value of the second driving current I2 transmitted from the input terminal 9 is provided to the inverting input terminal of the error amplifier 23. The output from the error amplifier 23 is transmitted to the PWM comparator 22 so that the second driving voltage becomes the preset reference voltage Vref. The PWM comparator 22 turns-on/off the NMOS Tr8 at a high speed based on the on/off duty ratio determined by a preset sawtooth wave and the output from the error amplifier. As a result, the NMOS Tr8 is controlled to cause the second driving current I2 to be constant, so that the second driving voltage is fed back to become the preset reference voltage Vref.

The resistance value across the resistor R12 or the resistor R14 when the NMOS Tr6 or the NMOS Tr7 is turned-on is changed to a smaller value than the resistance value when the NMOS Tr6 or the NMOS Tr7 is turned-off, such that current value of the first driving current I1 is controlled to become larger than that of the second driving current I2.

(C) Next, the operation of the lighting control circuit 1 when the switch SW1 and the switch SW2 are simultaneously turned-on will be described.

When the switch SW1 and the switch SW2 are simultaneously turned-on, the DC power voltage (+B) is provided to the first control terminal 4 and the second control terminal 5, and the DC power voltage is transmitted to the switching terminal 7 of the current controller 3 through the first control terminal 4, the parasitic diode D3, and the diode D1. Current flows in the parasitic diode D3 to generate the potential difference between the gate and the source of the PMOS Tr1, thereby turning-on the PMOS Tr1. In this case, the output from the switching terminal 7 is in a high level, such that the first current is supplied to the common terminal 6.

The NPN Tr4 is turned-on by receiving the DC power voltage (e.g., a control signal) through the diode D1. When the NPN Tr4 is turned-on, the NPN Tr3 is turned-off.

Although the switch SW2 is turned-on, the NPN Tr3 is turned-off because the NPN Tr4 is turned on. When the NPN Tr3 is turned-off, the potential difference is not generated in the resistor R3, and thus, the gate-source voltage of the PMOS Tr2 is not generated, and the PMOS Tr2 is turned-off.

Since the PMOS Tr2 is turned-off, the second driving current I2 is not supplied to the common terminal 6. Therefore, the first driving current I1 is transmitted to the common terminal 6 through the PMOS Tr1.

The case in which current controller 3 uses the constant current clamp circuit (see, e.g., FIG. 2) and the case in which current controller 3 uses the switching regulator circuit (see, e.g., FIG. 3) are the same as the case in which only the switch SW1 is turned-on and therefore, the description thereof will be omitted.

As described above, even when the switch SW1 and the switch SW2 are simultaneously turned-on, the light source lighting circuit 1 has the same operation as the case in which only the switch SW1 is turned-on. Therefore, the first driving current I1 causing the light source lighting circuit 1 to function as the daytime running lamp is first transmitted.

The functions of the daytime running lamp and the position lamp are implemented as the common light source, and further the PMOS transistor with the low on-resistance is used as the countercurrent prevention unit even when the daytime running lamp is first operated. Therefore, the increase in the circuit loss and the heat generation of the circuit of the countercurrent prevention unit may be suppressed, and the countercurrent due to the reverse connection of the battery may be prevented.

In addition, since the PMOS transistor which is less expensive than the diode is used as the countercurrent prevention unit, the product costs of the light source lighting circuit and the lamp system for a vehicle including the same may be reduced, and the countercurrent caused by the reverse connection of the battery may be prevented.

While aspects of embodiments of the present invention have been shown and described above, other implementations are within the scope of the claims. It will be understood by those skilled in the art that various changes in form and details may be made therein without departing from the spirit and scope of the invention as defined by the appended claims.

What is claimed is:

1. A lighting circuit for a light source, comprising:
   a countercurrent prevention unit comprising a first control terminal and a second control terminal, the countercurrent prevention unit configured to transmit a first current or a second current that is smaller than the first current to the light source; and
   a current controller comprising: a common terminal connected to the first control terminal and the second control terminal; and a switching terminal connected to the first control terminal, the current controller configured to provide a first driving current or a second driving current from the common terminal to the light source, wherein the first driving current corresponds to the first current, and the second driving current corresponds to the second current,
   wherein the countercurrent prevention unit further comprises:
   a first rectifier, wherein voltage at the first control terminal is provided to the switching terminal through the first rectifier;
   a first P-FET provided between the first control terminal and the common terminal;
   a second P-FET provided between the second control terminal and the common terminal; and
   a second rectifier provided between the second P-PET and the common terminal, wherein the second rectifier is series-connected to the second P-PET, and
   wherein when DC power voltage is provided to the first control terminal, the first P-FET is turned-on and the second P-FET is turned-off, and then the countercurrent prevention unit transmits the first current to the light source, and
   wherein when the DC power voltage is not provided to the first control terminal but provided to the second control terminal, the second P-FET is turned-on, and then the countercurrent prevention unit transmits the second current to the light source.

2. The lighting circuit of claim 1, wherein the countercurrent prevention unit further comprises:
   a first resistor, wherein one end of the first resistor is connected to a gate terminal of the first P-FET and the other end of the first resistor is connected to the second P-FET and the second rectifier; and
   a second resistor, wherein one end of the second resistor is connected to the gate terminal of the first P-FET and the other end of the second resistor is connected to a ground, wherein a resistance value of the second resistor is larger than that of the first resistor.

3. The lighting circuit of claim 2, wherein the countercurrent prevention unit further comprises:
   a third rectifier provided between the first resistor and the second P-FET and connected in series with the first resistor.

4. The lighting circuit of claim 3, wherein the countercurrent prevention unit further comprises:
   switch driving circuits configured to receive control signals from the first control terminal and the second control terminal and transmit a switch driving signal to a gate terminal of the second P-FET.

5. The lighting circuit of claim 2, wherein the countercurrent prevention unit further comprises:
   switch driving circuits configured to receive control signals from the first control terminal and the second control terminal and transmit a switch driving signal to a gate terminal of the second P-FET.

6. The lighting circuit of claim 1, wherein the countercurrent prevention unit further comprises:
   switch driving circuits configured to receive control signals from the first control terminal and the second control terminal and transmit a switch driving signal to a gate terminal of the second P-FET.

7. A lamp system for a vehicle comprising:
   the lighting circuit of claim 1; and
   the light source.

* * * * *